Jan. 17, 1933.  I. HECHENBLEIKNER  1,894,768
CATALYTIC APPARATUS
Filed April 3, 1929
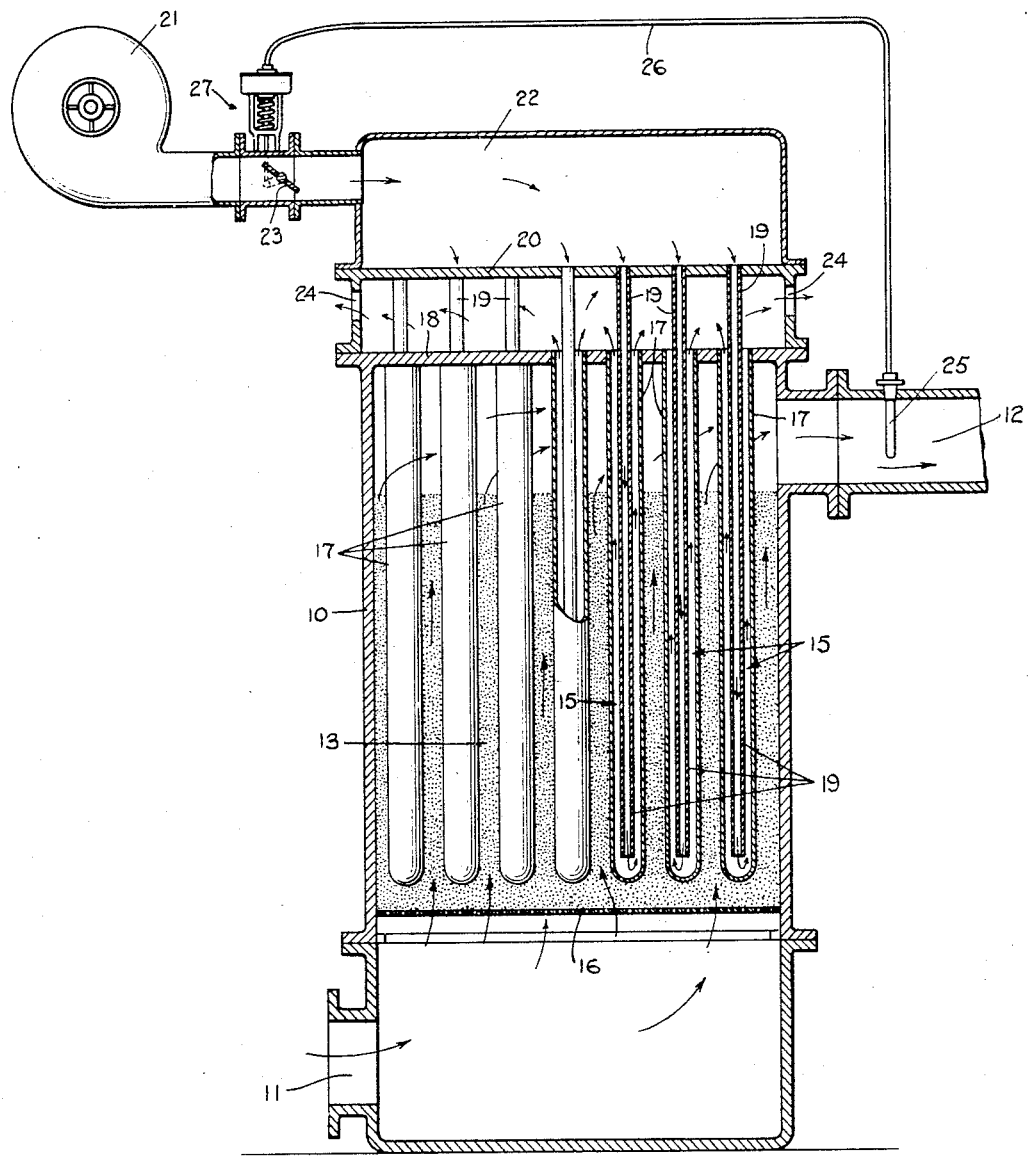
INVENTOR
Ingenuin Hechenbleikner
BY
Cavanagh & Jones
ATTORNEYS Patented Jan. 17, 1933

1,894,768

UNITED STATES PATENT OFFICE

INGENUIN HECHENBLEIKNER, OF CHARLOTTE, NORTH CAROLINA, ASSIGNOR, BY MESNE ASSIGNMENTS, TO CHEMICAL CONSTRUCTION CORPORATION, A CORPORATION OF DELAWARE

CATALYTIC APPARATUS

Application filed April 3, 1929. Serial No. 352,094.

This invention relates to a converter system or catalytic apparatus, and relates more particularly to a converter apparatus for carrying out catalytic reactions in the vapor phase; and has special reference to the provision of a converter system adapted for use in the catalytic oxidation of sulphur dioxide.

In catalytic apparatus, particularly of the types employed for oxidizing sulphur dioxide in the contact method of producing sulphuric acid, it is requisite to keep the temperatures under control not only in the catalyst mass which is subjected to the fresh reaction gases, but also in the last catalyst layers or sections which are required to effect the last few percent of reaction. This is due to the fact that the catalytic reaction is relatively sensitive to temperature; and too high a temperature in the latter portions of the catalyst mass or in the last catalyst layers results in a reversible reaction or reversion of the gases and hence in an incomplete oxidation process. The efficiency of the converter system as a whole will therefore be retarded by an increase of temperature above a certain optimum. On the other hand, decreasing temperatures will result in greatly retarding the velocity of the reaction and in rendering necessary a larger amount of contact substance or mass. In order to obtain maximum efficiency with minimum of contact substance, it is hence desirable to permit the reaction to take place at a higher temperature than the optimum for maximum conversion at the start or initial stages of the reaction and to materially diminish the temperatures at the end of the reaction process down to a point near the optimum temperature for maximum conversion.

For accomplishing the regulation or control of the temperatures in such catalytic reactions, it has heretofore been suggested, as set forth in Letters Patent to Knietsch Nos. 652,119; 688.020 and 823,472, to arrange the catalyst mass in columns or pipe systems in which the reaction heat is removed by a current of air or gas passing outside of the pipes which carry the reaction mass, heat exchange or cooling of the contact mass being also arranged between incoming gas and the reaction mass. This type of construction, however, suffers the disadvantage that one cannot completely control the last stages of the reaction satisfactorily, for which reason the efficiency is not as high as desired or as may be obtained. This is particularly true when it is desired to control the travel of the reaction gases in large units.

For accomplishing the desired control of the temperatures in these catalytic reactions, it has also been suggested, as embodied in more modern apparatus, to provide for a heat exchange between the fresh gases and the reaction gases, several different types of converters having been proposed for solving the problems which arise in the use of such heat exchange principles. Such apparatus is in use today to much advantage. One disadvantage of the same, however, is that it is necessary to cool the fresh or incoming gases down below the temperature at which reaction takes place, the gases being then brought up by heat exchange to suitable reaction temperatures. Such apparatus suffers the disadvantage that it not only requires more cooling surface, but it is very sensitive to temperature changes, with the result that if the temperature for some reason drops, the operation of the system is quickly brought out of balance, because the reaction slows down or decreases in velocity rapidly by dropping or decreasing the temperature. It is then necessary to re-start the system by heating up the mass to reaction temperature again.

I have found that a very efficient regulation or control of the temperatures in the converter may be had by providing a cooling means for the converter in which a cooling fluid independent of the reaction gases is caused to flow through the contact mass in a manner to obtain a maximum efficiency with a minimum of contact substance. The maximum efficiency is obtained by producing a flow of the cooling medium so as to permit the reaction to take place first at a higher temperature than the optimum for maximum conversion at the start or initial stages of the reaction and to materially diminish the temperatures in the last stages of the reaction process down to a point near the optimum temperature for maximum conversion. These results I have found may be accomplished by simply cooling the contact mass by air that can be properly controlled so as to obtain almost ideal operating conditions. By the use of this apparatus, the fresh or entrant gases need not be cooled prior to admitting the same to the converter, and I have found that by employing the principles of the present invention the apparatus is not as critical or sensitive to temperature changes as those of prior construction.

To the accomplishment of the foregoing and such other objects as will hereinafter appear, my invention consists in the elements and their relation one to the other as hereinafter more particularly described and sought to be defined in the claims; reference being had to the accompanying drawing, which shows the preferred embodiment of my invention, and in which:

The figure is a vertical elevational view taken in cross-section of a converter system embodying the principles of my present invention.

Referring now more in detail to the drawing, the converter system of the invention comprises a converter chamber generally designated as 10 having entrant and exit openings 11 and 12 respectively for the reaction gases, said chamber holding a catalyst mass 13 and a cooling apparatus generally designated as 15 for controlling the reaction temperatures developed by the reactions in said catalytic mass 13.

The contact mass 13 is supported on a gas permeable bottom 16 and extends in said chamber 10 to a level somewhat below the exit flue 12. The $SO_2$ gas enters at the entrant opening 11 and moves upwardly through the contact mass 13 for reaction, the $SO_3$ gas leaving at the exit 12, said gases flowing in the direction indicated by the arrows in the figure. In the operation of the system the fresh gases will enter at a temperature of from 700 to 850° F. and will leave the system at a temperature of about 850° F., and the reaction temperatures developed at the hottest region of the converter will be in the neighborhood of 1100° F. Thus in operation the converter will have a first region or zone characterized by a temperature increasing gradient and a succeeding region or zone characterized by a temperature decreasing gradient.

A desideratum of the invention, as heretofore set forth, centers about the provision of a cooling means operating so that an intense cooling of the reaction gases may be effected in the hot zone or at the initial stages of the reaction process and a diminished and more moderate cooling may be effected in the terminal or latter stages of the reaction process, by means particularly of a cooling fluid independent of the reaction gases. This I accomplish by the provision of a cooling apparatus comprising a plurality of ducts disposed in the catalytic mass 13 with means for causing a cooling fluid such as air to flow through said ducts in the same direction as the direction of movement of the reaction gases through the contact mass, whereby an intense cooling of the contact mass is effected in the initial stages of the reaction and a diminished and more moderate cooling in the last stages of the reaction.

In the preferred embodiment of the invention, this is accomplished by providing more specifically a plurality of upright tubes 17, 17 having closed bottoms, at least a portion of said tubes being embedded in a catalyst mass 13, the said tubes being open at their upper ends and supported at their upper ends in a gas impermeable partition 18 which defines the roof of the catalytic chamber. Combined with these closed ended tubes 17, 17, there are provided a plurality of open ended tubes 19, 19 supported in a second partition 20 above the gas impermeable partition 18, the open ended tubes 19, 19 passing downwardly into the closed ended tubes 17, 17 and extending for a substantial distance therein below the level of the catalyst mass 13. Preferably the inner or open ended tubes 19, 19 extend to a point close to the bottom of the outer or closed ended tubes 17, 17 and, preferably the closed ended tubes 17, 17 terminate in the hot zone or in the region of the converter where the high reaction temperature is developed. These tubes provide the means through which a cooling fluid such as air is caused to flow for controlling the temperatures of the converter.

The cooling air is supplied by a fan or blower 21 which connects with a distributing chamber 22 with which the upper ends of the tubes 19 communicate, the cooling air being regulated by a damper 23. From the distributing chamber 22 the cooling air flows downwardly through the open ended tubes 19 and then upwardly through the closed ended tubes 17, as indicated by the arrows shown in the figure, so that the cooling air moving in contact with the walls of the outer tubes flows in the same direction as the direction of movement of the reaction gases through the contact mass. In this way an intense cooling of the contact mass is effected in the initial stages of the reaction and in the zone where the highest temperatures are developed, and a diminished and more moderate cooling is effected in the last stages of the reaction. In other words, in this manner a maximum cooling effect is obtained where the reaction heat reaches the maximum, and as the reaction heat slows up, the cooling will be more moderate and in this way almost ideal conditions are obtained. The air after flowing through the tubes discharges into the chamber defined by the partitions 18 and 20 and out through the openings 24, 24.

In the preferred construction the flow of the cooling medium or air is made automatic and is governed by the exit temperatures of the reaction gases. To this end there is provided a thermometer 25 arranged in the exit flue 12 of the $SO_3$ gases which is connected by a flexible conduit 26 for automatically opening or shutting off the damper 23 through a regulator 27 of any well-known make, this so as to obtain the most favorable conditions for maximum conversion. In this way the temperature control is maintained substantially constant or invariant for optimum conversion.

The use and operation of the converter of my present invention will in the main be fully apparent from the above detailed description thereof. The converter may be used in connection with platinum mass, as well as in connection with vanadium contact mass and other active materials. The converter may also be combined if desired with a gas filter which may be placed at the bottom of the converter. It will be noted that the tubes of the cooling apparatus are independently supported in the system so as to permit of independent heat expansion. The apparatus is readily regulatable and of substantially simple construction. It will be understood that numerous changes may be made in the construction thereof and in the arrangement of the parts without departing from the spirit of the invention, defined in the following claims.

I claim:

1. A converter system comprising a chamber having entrant and exit openings for the reaction gases, a catalytic mass in said chamber, and a cooling apparatus for controlling the temperatures of the reaction gases developed in said chamber, said cooling apparatus comprising a plurality of ducts disposed in the catalytic mass, and means for causing a cooling fluid independent of the reaction gases to flow through said ducts in the same direction as the direction of movement of the reaction gases through the contact mass whereby an intense cooling of the contact mass is effected in the initial stages of reaction and a diminished and more moderate cooling in the last stages of reaction.

2. A converter system comprising a chamber having entrant and exit openings for the reaction gases, a catalytic mass in said chamber, and a cooling apparatus for controlling the temperatures of the reaction gases developed in said chamber, said cooling apparatus comprising a plurality of tubes embedded in the catalytic mass, and means for causing cooling air to flow through said tubes in the same direction as the direction of movement of the reaction gases through the contact mass whereby an intense cooling of the contact mass is effected in the initial stages of reaction and a diminished and more moderate cooling in the last stages of reaction.

3. A converter system comprising a chamber having entrant and exit openings for the reaction gases arranged at opposite ends of the chamber, a catalytic mass in said chamber, the said catalytic mass during operation of the system having a first zone of a temperature increasing gradient and a succeeding zone of a temperature decreasing gradient, and a cooling apparatus for controlling the temperatures of the reaction gases developed in said chamber and for producing the different temperature gradients, said cooling apparatus comprising a plurality of ducts disposed in the catalytic mass, and means for causing a cooling fluid independent of the reaction gases to flow, beginning within said first temperature gradient zone, through said ducts in the same direction as the direction of movement of the reaction gases through the contact mass whereby an intense cooling of the contact mass is effected in the initial stages of reaction and a diminished and more moderate cooling in the last stages of reaction.

4. A converter system comprising a chamber having entrant and exit openings for the reaction gases arranged at opposite ends of the chamber, a catalytic mass in said chamber, the said catalytic mass during operation of the system having a first zone of a temperature increasing gradient and a succeeding zone of a temperature decreasing gradient, and a cooling apparatus for controlling the temperatures of the reaction gases developed in said chamber and for producing the different temperature gradients, said cooling apparatus comprising a plurality of tubes embedded in the catalytic mass, the tubes extending through the contact mass and terminating at a region within the first temperature gradient zone, and means for causing a cooling fluid independent of the reaction gases to flow through said tubes in the same direction as the direction of movement of the reaction gases through the contact mass whereby an intense cooling of the contact mass is effected in the initial stages of reaction and a diminished and more moderate cooling in the last stages of reaction.

5. A converter system comprising a chamber having entrant and exit openings for the reaction gases, a catalyst mass in said chamber, upright tubes having closed bottoms, at least a portion of the tubes being embedded in the catalyst mass, open ended tubes passing downwardly into the closed ended tubes and extending for a substantial distance below the level of the catalyst, and means for causing a cooling fluid independent of the reaction gases to pass downwardly through the open ended tubes and then upwardly through the closed ended tubes, the movement of the cooling fluid in contact with the walls of the closed ended tubes being in the same direction as the direction of movement of the reaction gases through the contact mass whereby an intense cooling of the contact mass is effected in the initial stages of reaction and a diminished and more moderate cooling in the last stages of reaction.

6. A converter system comprising a chamber having entrant and exit openings for the reaction gases, a catalyst mass in said chamber, upright tubes having closed bottoms, at least a portion of the tubes being embedded in the catalyst mass, open ended tubes passing downwardly into the closed ended tubes and extending for a substantial distance below the level of the catalyst, means for causing a cooling fluid independent of the reaction gases to pass downwardly through the open ended tubes and then upwardly through the closed ended tubes, the movement of the cooling fluid in contact with the walls of the closed ended tubes being in the same direction as the direction of movement of the reaction gases through the contact mass whereby an intense cooling of the contact mass is effected in the initial stages of reaction and a diminished and more moderate cooling in the last stages of reaction, and means controlled by the reaction temperatures developed in the system for controlling the said flow of the cooling medium.

7. A converter system comprising a chamber having entrant and exit openings for the reaction gases, a catalytic mass in said chamber, a gas permeable bottom supporting said catalyst, a gas impermeable partition above the catalyst, upright tubes having closed bottoms, at least a portion of the tubes being embedded in the catalyst and the open ends of the tubes being supported in the gas impermeable partition, a second partition above the gas impermeable partition, open ended tubes supported in the second partition and passing downwardly into the closed ended tubes and extending for a substantial distance therein below the level of the catalyst, and means for causing a cooling fluid to flow downwardly through the open ended tubes and then upwardly through the closed ended tubes and out through a chamber defined by the two upper partitions, the cooling fluid moving in contact with the walls of the upright tubes flowing in the same direction as the direction of movement of the reaction gases through the contact mass whereby an intense cooling of the contact mass is effected in the initial stages of reaction and a diminished and more moderate cooling in the last stages of reaction.

8. A converter system comprising a chamber having entrant and exit openings for the reaction gases, a catalytic mass in said chamber, a gas permeable bottom supporting said catalyst, a gas impermeable partition above the catalyst, upright tubes having closed bottoms, at least a portion of the tubes being embedded in the catalyst and the open ends of the tubes being supported in the gas impermeable partition, a second partition above the gas impermeable partition, open ended tubes supported in the second partition and passing downwardly into the closed ended tubes and extending for a substantial distance therein below the level of the catalyst, means for causing a cooling fluid to flow downwardly through the open ended tubes and then upwardly through the closed ended tubes and out through a chamber defined by the two upper partitions, the cooling fluid moving in contact with the walls of the upright tubes flowing in the same direction as the direction of movement of the reaction gases through the contact mass whereby an intense cooling of the contact mass is effected in the initial stages of reaction and a diminished and more moderate cooling in the last stages of reaction, and means controlled by the temperature of the reaction gases at said exit opening for controlling the flow of the cooling fluid through the system.

9. A converter system comprising a chamber having entrant and exit openings for the reaction gases, a catalyst mass in said chamber, upright tubes having closed bottoms, at least a portion of the tubes being embedded in the catalyst mass, open ended tubes passing downwardly into the closed ended tubes and extending for a substantial distance below the level of the catalyst, the said closed and open ended tubes being independently supported, and means for causing a cooling fluid independent of the reaction gases to pass downwardly through the open ended tubes and then upwardly through the closed ended tubes, the movement of the cooling fluid in contact with the walls of the closed ended tubes being in the same direction as the direction of movement of the reaction gases through the contact mass whereby an intense cooling of the contact mass is effected in the initial stages of reaction and a diminished and more moderate cooling in the last stages of reaction.

10. A converter system comprising a chamber having entrant and exit openings for the reaction gases, a catalyst mass in said chamber, a cooling apparatus for controlling the temperatures of the reaction gases developed in said chamber, said cooling apparatus comprising a plurality of ducts disposed in the catalytic mass, and means for causing a cooling fluid independent of the reaction gases to flow through said ducts in the same direction as the direction of movement of the reaction gases through the contact mass whereby an intense cooling of the contact mass is effected in the initial stages of reaction and a diminished and more moderate cooling in the last stages of reaction, and means controlled by the temperature of the developed reaction gases for controlling the flow of said cooling fluid through the system.

Signed at Charlotte, in the county of Mecklenburg and State of North Carolina, this 25 day of March, A. D. 1929.

INGENUIN HECHENBLEIKNER.